UNITED STATES PATENT OFFICE.

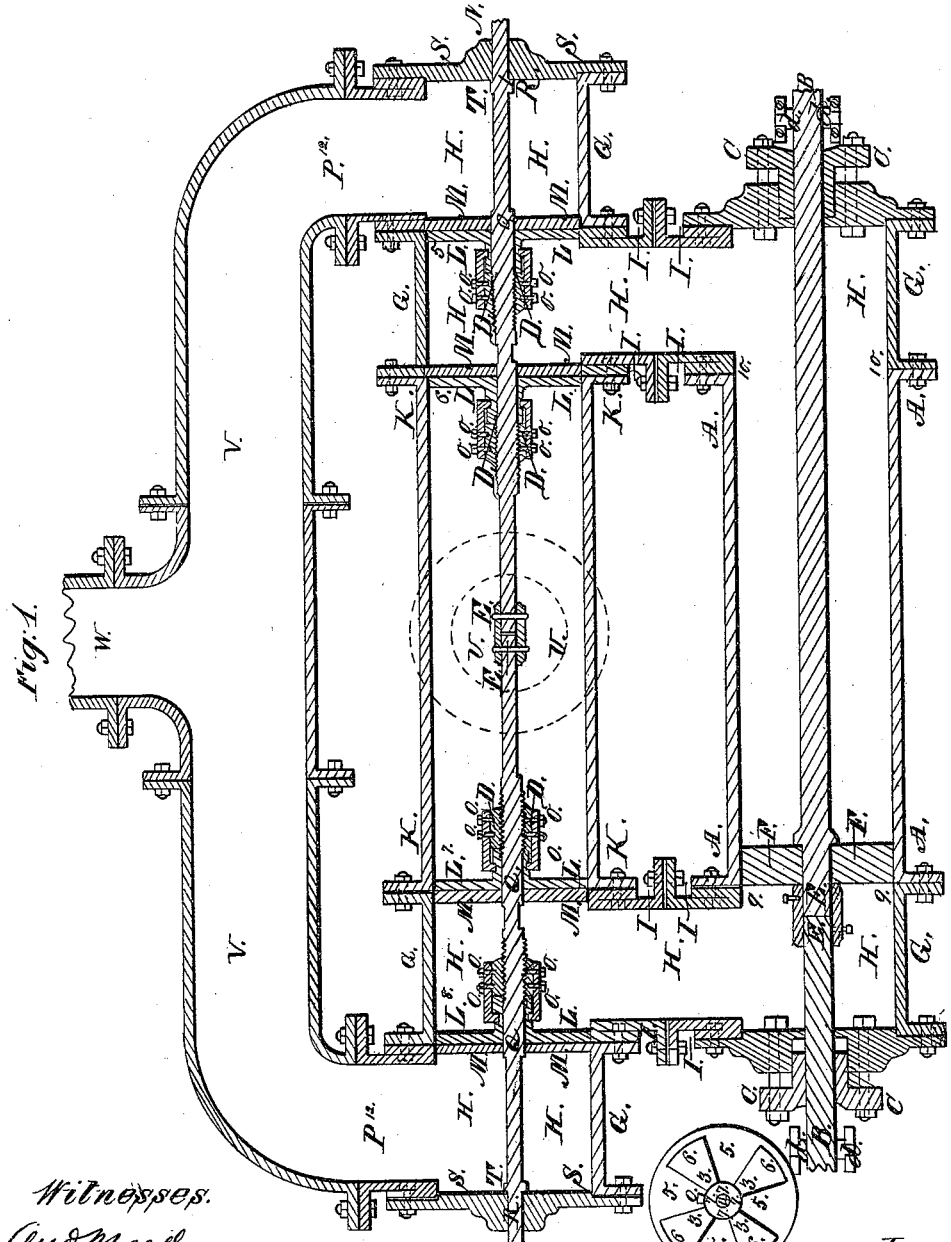

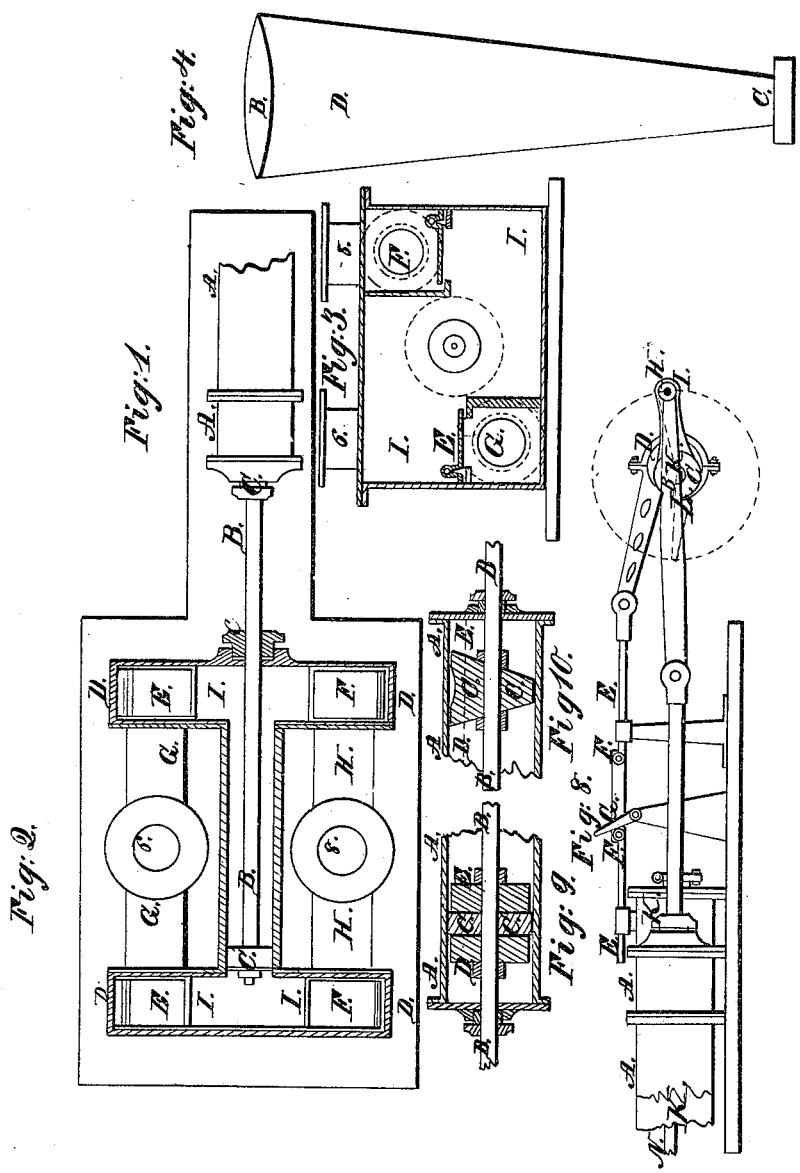

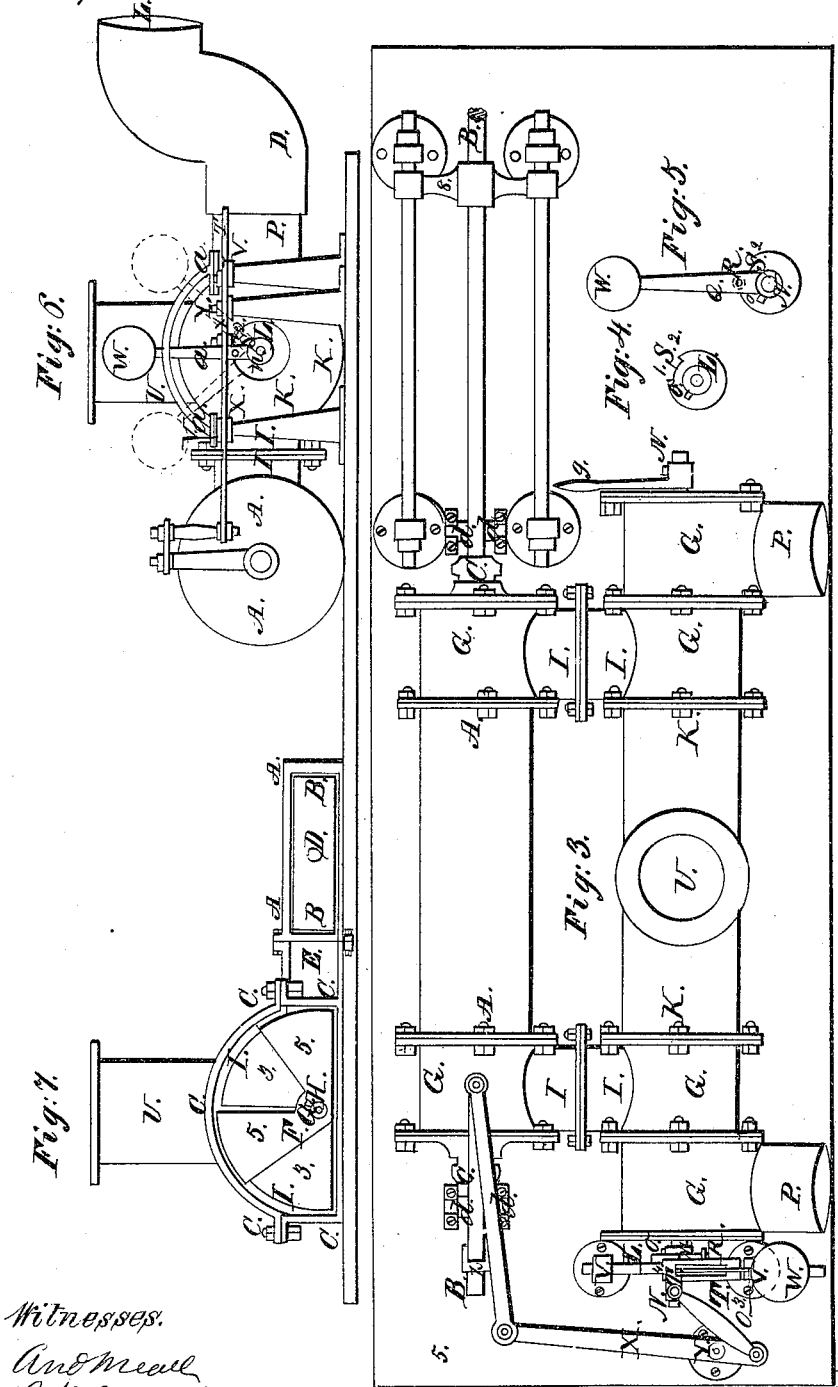

WILLIAM KENNISH, OF PATERSON, NEW JERSEY, ASSIGNOR TO CORNELIUS S. VAN WAGONER.

ARRANGEMENT OF VALVES OF HYDRAULIC ENGINES.

Specification of Letters Patent No. 7,023, dated January 15, 1850.

*To all whom it may concern:*

Be it known that I, WILLIAM KENNISH, a subject of Great Britain, at present residing at Paterson, in the county of Passaic and State of New Jersey, have invented a new and useful machine, known and designated by the title of "the hydraulic engine," for the purpose of giving reciprocating or rotary motion to all kinds of machinery by the greatest pressure or weight that a column of water in its natural state of temperature is capable of imparting; and I do hereby declare that the following is a full, clear, and exact description of the construction and operation of the same, reference being had to the annexed drawings, making a part of this specification.

Figure 1, Plate I, represents a longitudinal sectional drawing of the engine in a horizontal position. A, A, a cast iron cylinder. B, B, the piston rod passing through both ends of the cylinder, through the stuffing boxes C, C, and is made in two parts, and connected by a coupling box E, E. The piston F, is made to move in the cylinder free from friction, it being made to admit a line of water to escape betwen it and the internal surface of the cylinder and maintained in such a position by the piston rod moving over friction rollers d, d. Said rollers are adjustable to compensate the wear of the piston rod and prevent the piston rubbing against the lower side of the cylinder, G, G, the extending pipes to form the water courses H, H. To G, G, are fastened the connecting pipes I, I,—K, K, the valve casing.

L, L, are the moving valves fixed to the spindle N, N, by the screws O, O,—M, M, the fixed valves secured to the pipes G, G, admitting the spindle N, N, to pass freely through their center at Q, Q. The valves are perforated in four equal areas or spaces, shown by 3, 3, Fig. 2. The opening composing one third of the area of the valve and placed face to face, but not so as to touch or cause the least degree of friction, shown by the line between L, and M, Fig. 1, Plate I.

P, P, are the eduction pipes, through which the waste water passes off. The spindle N, N, Fig. 1, Plate I, passing through the valve casing K, K, and the extending pipes G, G, moves freely in the journals R, R, in the pipe covers S, S, and is prevented from shifting its position by the shoulders T, T. The operation of the valves may be explained by supposing the valve Fig. 2, to be placed in a vertical position on the spindle N, N, passing horizontally through its center at 4, then supposing it to be an L, or moving valve secured to the spindle N, N, by the set screws O, O. In like manner let all the four L, valves be placed on the spindle N, N, at the proper places, viz, at 5, 6, 7, and 8, in Fig. 1, the stationary valves M, M, &c., being previously fixed in the pipes in the following position, the holes 3, 3, &c., Fig. 2, in the valve M, at 5, are placed opposite the blanks 5, Fig. 2, in the valve at 6, then that the valve at 5, may be opened when those at 6, are shut or closed, the valve L, at 5, is secured to the spindle with its holes 3, 3, &c., opposite to the holes 3, 3, in the valve M, and allow a full passage to the water through both valves L, and M, at 5, see arrows, in the contrary manner the blanks 5, 5, are set opposite the holes 3, 3, in the valves M, at 6, and shut off the water passage; then it follows, that when 5, is opened, 6, is shut, and when 6, is opened 5, is shut. In like manner operate 7, and 8, only the valves at 8, must be opened when those at 5, are shut and the valves at 7, opened when those at 6, are shut, and contrariwise to continue the motion.

To explain the operation of the water on the piston, valves and its passage through the different water courses composing the machine—first, the motive or pressing column of water is admitted through the dotted induction or supply pipe U, Fig. 1, Plate I, (see arrows,) into the valve casing K, K, which is always full from 6, to 7, at all times and under all circumstances when the engine is working, the piston F, being at the end of its stroke and ready to move by the pressure of the water in the direction of 10. In order that such may be accomplished the valves at 6, are closed and those at 7, opened, admitting the pressure of the motive column to pass freely from U, through each to the piston at 9, see arrows; in such a state (the valves at 8, being closed affording no escape for the water) the piston will be forced in the direction of 10, by the whole force of the column until it arrives at 10, when the valves at 7, are closed and those at 6, opened and divert the pressure to the opposite side of the piston, the valves at 5, being closed and those at 8, opened, the former to prevent the escape of the pressing column through the exhausting pipe P, at 12, and the latter to admit the waste water expended in performing the previous stroke to pass through the exhausting pipe P, at 13, and thus perform an alternate or a reciprocating motion.

The valves L, in each opening 5, 6, 7, and 8, are so fixed by the set screws O, that they just touch the facing of the valves, M, M, and being ground together previously, the escape of water between them when shut off is of no consideration. The valves L, are secured to N, by set screws O, and adjusting screw nuts D, D, turning on a worm or screw on the spindle N, by which means the L, valve is placed in its right position and there fixed by the screws O. Each pair of acting valves say 6, and 8, and 5, and 7, being pressed equally by the motive column and they being of equal areas, it communicates only a tendency to tear asunder the particles of the spindle N, N, or force the valves L, from the hold of the screws O, O, consequently the valves are worked free from pressure and friction, let the weight of the column be what it may. The journals R, R, in the pipe covers S, S, as well as those in Q, Q, in the center of the valves M, are also unpacked and create no other friction than the weight of the L, valves and that of the spindle N, N.

Fig. 3, Plate II, represents an external view of the engine in a horizontal position. The cylinder, valve casing and all the different pipes are lettered to correspond with the sectional drawing Fig. 1, it being an external representation of that figure and requires no further explanation than that already given so far as regards the cylinder and all the pipes constituting the engine, as well as the connection and fastenings. The parts needing explanation are the gearing for working the valves—first, the disk L, represented in Fig. 4, is secured to the valve spindle end at M, Fig. 3, by the screw O, the lever Q moves freely on N, at the lower end, see Fig. 5, with a pin R, fastened to it and passes over the edge of L, in the recess S, Fig. 4, between the catches 1, and 2. On the upper end of Q, there is a ball W, of sufficient weight to turn the spindle N, and valves one way or the other. Q, moves in a slit in the slide T, Figs. 3, and 6, Plate II, which again is moved in the guides V, V, in a right angled line to the spindle N, by the lever X, moving on the fulcrum Y, and attached to the piston rod B, at Z.

The piston is represented at the end of the stroke and the ball at the 3, end of the slide placing the valves in a right position for the following stroke. When motion is given to the lever X, by the piston rod B, in the direction of 5, moving the slide in the direction of 4, and lift the ball over the vertical line, then it will fall by its own weight and reverse the position of the valves for the next stroke, and so on preserving a uniform motion to the speed of the piston. In a single engine giving motion to a pump without the application of a flywheel, the assistance of the ball, weights or springs is absolutely necessary to maintain a reciprocating motion. 8, is a crosshead or guide to steady the piston rod B, when giving motion to machinery by the assistance of a crank, the connecting rod being fastened to B, outside of 8, in a joint, Fig. 3, Plate III.

9, Fig. 3, Plate II, is the starting bar to start or stop the engine, it being secured to the spindle N, and by moving it one way or the other, the valves are reversed at will, causing the engine to be entirely under control.

Fig. 6, is an end view of the engine, the different parts of which are also lettered to correspond with those in Figs. 1, and 3, Plates I, and II, excepting the arc a, a, secured to the columns or guides V, V, to stop the fall of the ball at the right position shown by the dotted representation of the ball and lever on each side of the center regulating the right throw of the valves and preventing the lever striking the slide T, in its fall at 3, and 4, Fig. 3.

Fig. 7, Plate II, represents a modification of the hydraulic engine constructed to work under a low fall. This contsruction is similar in all respects to the construction of Fig. 1, Plate I, viz, that the water courses, connections and fastenings are all of the same nature, only, instead of being cylindrical, they are of a rectangular figure, and the mode of operation is precisely the same as represented and set forth in the explanation of Fig. 1, Plate I, viz, that the four valves are attached to the one spindle and operated on by the weight W, Fig. 3, Plate II. The figure represents a sectional end view of the parallelogram modification of the hydraulic engine showing the piston B, B, prepared to move in the rectangular casing A, A. D, the piston rod. C, C, the valve casing connected to A, A, by the water courses E, E. F, F, the moving valve fastened to the spindle G, by the screw H. I, I, &c., is the stationary valve fixed in the interior of the valve casing C, C, &c., in the same manner as the M, or stationary valves in Fig. 1, Plate I. The valve is represented opened prepared to allow the motive column to pass from the supply pipe U, through the spaces 3, 3, and the water course E, to the piston B, B, until the stroke is performed, when the moving valve is turned and the blanks 5, 5, cover the spaces 3, 3, and shut off the communication and admit the pressure on the opposite side of the piston B, B, the motion is continued, as explained in the operation of the valves in Fig. 1, Plate I, and Fig. 3, Plate II.

When it is required to impart a rotary motion to a shaft by means of a crank or otherwise a double engine (if preferred to the single one) can be made use of with a fly wheel of half the weight required for a single one of equal power to the two, if by cranks, they are placed at right angles to each other on the shaft, so that when the one engine is on the center the other is on the quadrature, or in full power to carry the other over the center assisted by the fly wheel, and thereby maintain a uniformity of speed and power.

My plan for shutting and opening the valves in a rotary motion is that they begin to open when the crank is within five degrees from coming to the center, half open when on the center and fully open when five degrees past the center. The object of this arrangement is to prevent the concussion that would otherwise take place through the non-elasticity of the water if the column were thrown on the opposite side of the piston when the crank passes the center as in the case of the steam engine, the elasticity of the steam accommodating itself to the momentary stoppage of the piston, before the reaction takes place, the flow of the water would be stopped (being non elastic) during that moment any pause and cause a concussion, but as the valves are half opened during that pause, the flow of the water passes equally through the valves 6 and 7, and also 5 and 8, Fig. 1, Plate I, maintaining a constant and uninterrupted flow and consequently prevent the concussion, also, maintaining a reciprocating motion with as much regularity as if the engine were moved by steam or other elastic body. The latter arrangement is effected by placing D, the eccentric, Fig. 8, Plate III, on the shaft B, so as to come to the full stroke when the crank is five degrees beyond or past the center.

A, is a part of the cylinder represented as giving motion to the shaft B, by the crank C, the eccentric rod E, E, is provided with a slit of proper length to traverse past the lever G, during the part of the stroke where the valves remain stationary, then at the proper time viz, when the crank is within five degrees of coming to the center at H, Fig. 8, Plate III, the end of the slide comes in contact with G, and begins to turn the valve spindle N, and when the crank arrives at the center I, the valves are half opened and fully opened when it is at K, and the eccentric at I, then a contrary motion will take place and allow the lever G, to remain at rest until the opposite end of the slit F, will move it in the contrary direction and produce the same effect when the crank is on the center L, agreeably to the above explanation.

When the engine is applied for the pumping of water only by a reciprocating motion as in Figs. 1 and 2, Plate III, Fig. 1, being a view of part of the engine horizontally placed, Fig. 2, the section of a pump, the piston rod B, passing through both the pump and engine and connected to the pump piston at C', passing through the stuffing boxes C, C, and the engine and pump, the length of the stroke of the pump being equal to that of the engine. At each end of the pump are valve boxes D, D, in which are placed the four valves, E, E, as suction valves, and F, F, as delivering valves. To the sides of the valve boxes are connected the two pipes, G, G, the suction pipe and H, H, the ascending pipe. The water is admitted through the orifice of the pipe at 6, from the head of the fall and passing alternately through the valves E, E, to the pump piston C', shown by the arrows, through the water courses I, I, which is forced also alternately through the delivering valves F, F, see arrows, and through the ascending pipe at 8, to the required height. A sectional elevation of the pump is shown in Fig. 3, Plate III, where the same letters refer to the different relative parts of the pump. This pump is constructed for the express purpose of being applied to the engine, and its operation is as follows: Where motion is given to the piston of the engine by the motive column, the same motion is parted to the piston of the pump, the area of which is in proportion to the area of the piston of the engine as the height of the column to be lifted is to that of the motive column.

Fig. 9, Plate III, represents a part of the cylinder with the piston C, secured to the piston rod B. D, and E, are air vessels or light wood in the solid secured to the piston rod on each side of the piston, to cause a buoyancy in the internal water, and thereby float the weight of the piston and rod and take their weight off the roller d, d, and stuffing boxes C, C, Fig. 3, Plate II, reducing all friction.

Fig. 10, Plate III, shows a vertical section of a piston C, made to form an angle to the path of the water in the horizontal direction of D, E, which force has a tendency to lift the weight of the piston and rod off the rollers and stuffing boxes as in the case of Fig. 9, which modes and figures hold good either in a cylinder parallelogram or any polygonal figure in the application of the engine.

The delivering pipes V, V, Fig. 1, Plate I, represent a mode for conveying the waste water clear of the premises &c, when necessary; but such an application is to be avoided when possible, as the water in passing through such a length of pipe is liable to retard the progress of the piston—the mode represented at P, P, Fig. 3, Plate II, is preferable.

D, Fig. 4, Plate III, represents the supply pipe to be attached to U, Fig. 3, Plate II, this pipe or trunk is formed after the form of a frustum of a cone, the upper or larger diameter B, is secured to the head of the fall, and the smaller or lower diameter C, to the supply or induction pipe U, Fig. 3, Plate II, &c, the larger diameter being proportionate to the smaller as the velocity of the water passing through a given sized orifice is to the velocity at whatever depth from the head the lower end is placed agreeably to the laws of gravitation.

D, Fig. 6, Plate II, is a delivering pipe constructed on the principle of the swivel, for the purpose of regulating the discharge of the waste water, according to the speed of the engine, when working at full speed the pipe D, is twirled on P, until the opening Z, is placed directly below the pipe P, that the water may pass off rapidly before the neutral side of the piston, offering as little resistance as possible to the moving column, but when the engine is moving slowly, the pipe D, is placed as it is represented in the drawing viz, that the lower side of the opening Z, may be on a level with the top of the water in the cylinder, to prevent the waste water passing off too rapidly before the piston and leave a vacancy when the escape valve is shut off to be filled up before the piston receiving the full pressure of the motive column. The nature and construction of the water gate or sluice for admitting the water from the supply pipe into the pipe U, Figs. 6 and 7, Plate II, vary according to the localities and other circumstances, only its area when open must be equal to that of the openings of the valves. Notwithstanding the hydraulic engine being here represented in a horizontal position for the purpose of obtaining as much of the height of the fall as possible it may be placed in any position found necessary; either horizontally, vertically, or at any angle to the horizon, also notwithstanding the figure of the piston being represented only cylindrical and parallelogramical, it may be formed into any polygonal figure found necessary, without altering the general design, under various circumstances.

What I claim as my invention and desire to secure by Letters Patent, is—

Arranging four register valves upon one spindle, in such a manner with reference to each other and their seats, so that the pressure upon any one of them shall be counterbalanced by the pressure upon some other of them substantially in the manner herein described for the purpose of regulating the induction and eduction to and from hydraulic engines.

In testimony whereof I the said WILLIAM KENNISH hereto subscribe my name in the presence of the witnesses whose names are hereto subscribed on the twenty fourth day of December, A. D., eighteen hundred and forty nine.

WILLIAM KENNISH.

Signed in the presence of—
  ANDW. MEAD,
  P. D. CANFIELD.